(12) United States Patent
Tutmark et al.

(10) Patent No.: US 9,174,094 B2
(45) Date of Patent: Nov. 3, 2015

(54) METHOD FOR CREATING POSITIVE HARDNESS GRADIENT IN IONOMER CORE AND GOLF BALL

(71) Applicant: NIKE, Inc., Beaverton, OR (US)

(72) Inventors: Bradley C. Tutmark, Aloha, OR (US); Eric Coats, Forest Grove, OR (US)

(73) Assignee: NIKE, Inc., Beaverton, OR (US)

( * ) Notice: Subject to any disclaimer, the term of this patent is extended or adjusted under 35 U.S.C. 154(b) by 384 days.

(21) Appl. No.: 13/906,711

(22) Filed: May 31, 2013

(65) Prior Publication Data
US 2014/0352733 A1  Dec. 4, 2014

(51) Int. Cl.
| | |
|---|---|
| B29C 70/74 | (2006.01) |
| A63B 45/00 | (2006.01) |
| A63B 37/00 | (2006.01) |
| B29L 31/54 | (2006.01) |
| B29K 33/00 | (2006.01) |
| B29L 22/00 | (2006.01) |
| B29K 105/00 | (2006.01) |
| B29C 45/16 | (2006.01) |

(52) U.S. Cl.
CPC ............. *A63B 45/00* (2013.01); *A63B 37/0039* (2013.01); *A63B 37/0075* (2013.01); *A63B 37/0083* (2013.01); *B29C 70/745* (2013.01); *B29C 45/16* (2013.01); *B29K 2033/00* (2013.01); *B29K 2105/253* (2013.01); *B29K 2995/007* (2013.01); *B29L 2022/00* (2013.01); *B29L 2031/546* (2013.01)

(58) Field of Classification Search
None
See application file for complete search history.

(56) References Cited

U.S. PATENT DOCUMENTS

| | | |
|---|---|---|
| 5,150,906 A | 9/1992 | Molitor et al. |
| 5,480,155 A | 1/1996 | Molitor et al. |
| 6,468,381 B1 | 10/2002 | Morgan |
| 6,632,147 B2 * | 10/2003 | Cavallaro et al. ............. 473/374 |
| 6,797,097 B2 | 9/2004 | Boehm et al. |
| 7,070,726 B2 | 7/2006 | Tzivanis et al. |
| 7,744,488 B2 | 6/2010 | Sullivan et al. |
| 7,946,932 B2 | 5/2011 | Sullivan et al. |
| 8,257,201 B2 | 9/2012 | Rajagopalan et al. |
| 2009/0124413 A1 * | 5/2009 | Sullivan et al. ............... 473/373 |
| 2009/0124418 A1 | 5/2009 | Sullivan et al. |
| 2009/0203469 A1 * | 8/2009 | Sullivan ........................ 473/374 |
| 2011/0064883 A1 | 3/2011 | Goodwin |
| 2014/0194223 A1 * | 7/2014 | Sullivan et al. ............... 473/375 |
| 2014/0194224 A1 * | 7/2014 | Sullivan et al. ............... 473/375 |
| 2014/0194226 A1 * | 7/2014 | Sullivan et al. ............... 473/375 |
| 2014/0309056 A1 * | 10/2014 | Sullivan et al. ............... 473/376 |

OTHER PUBLICATIONS

International Search Report for PCT/US2014/039527, dated Sep. 16, 2014.

* cited by examiner

*Primary Examiner* — Edmund Lee
(74) *Attorney, Agent, or Firm* — Honigman Miller Schwartz & Cohn LLP; Anna M. Budde; Jonathan P. O'Brien

(57) ABSTRACT

A hollow golf ball center defined by an intermediate layer including a thermoplastic ionomer resin neutralized at least about 40% with a metal cation is filled with an alcohol having up to three carbon atoms or an aqueous alcohol solution to create a hardness gradient in the intermediate layer. The alcohol or aqueous alcohol solution may be left in the center, removed from the center leaving the center hollow, or replaced by another material.

22 Claims, 1 Drawing Sheet

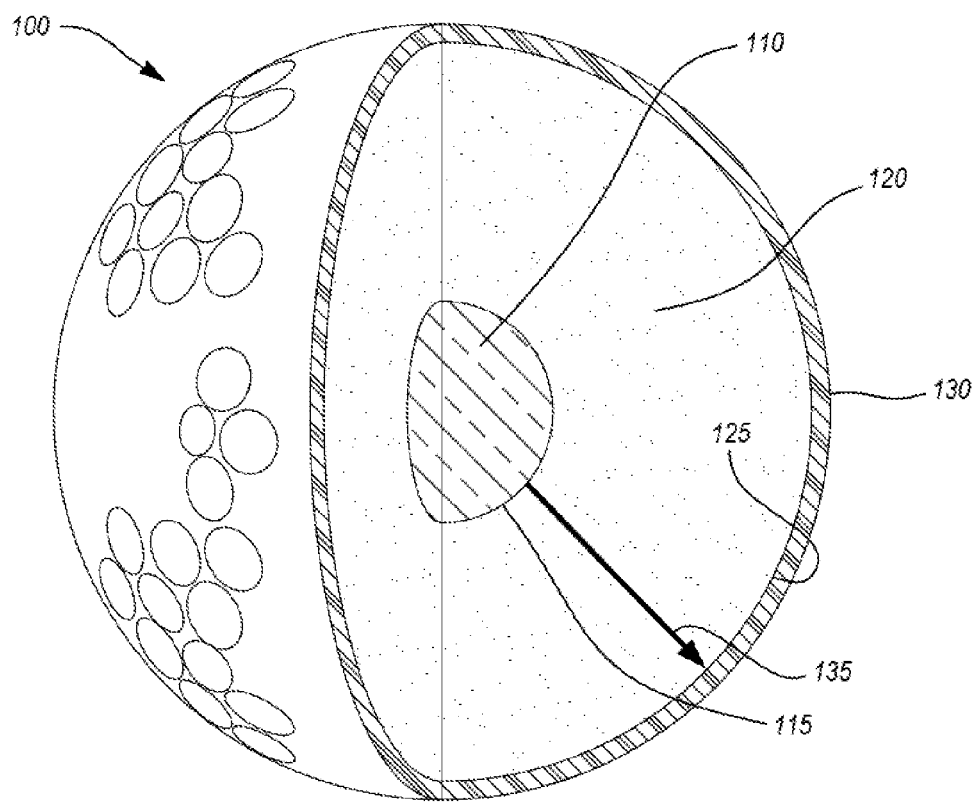

METHOD FOR CREATING POSITIVE HARDNESS GRADIENT IN IONOMER CORE AND GOLF BALL

FIELD OF THE INVENTION

The invention concerns methods for making golf balls with ionomer resin and the golf balls made.

BACKGROUND

This section provides information helpful in understanding the invention but that is not necessarily prior art.

Golf ball core and cover layers are typically constructed with polymer compositions including, for example, polybutadiene rubber, polyurethanes, polyamides, ionomers, and blends of such polymers. Ionomers, particularly ethylene-based ionomers, are a preferred group of polymers for golf ball layers because of their toughness, durability, and wide range of hardness values.

Golf ball compositions comprising highly neutralized acid polymers are known. For example, U.S. Pat. No. 7,375,151, the entire disclosure of which is incorporated herein by reference, discloses a highly-resilient thermoplastic ionomer resin composition comprising (a) melt-processable, ethylene acid copolymer; (b) aliphatic, mono-functional organic acid or its salt; (c) a thermoplastic resin; (d) a cation source; and (e) optionally, a filler. The ionomer resin may be neutralized to greater than 90% of all the acid groups present and remain melt-processable. The patent discloses using the highly-resilient thermoplastic composition in one-piece, two-piece, three-piece, and multi-layered golf balls.

Sullivan et al., U.S. Pat. No. 7,946,932 describes a golf ball with a fluid mass at its center enclosed in two mantle layers and a cover. The fluid center may be enclosed in a fluid center shell, which is preferably an elastomer with high temperature resistance. The fluid may be a gas, liquid, paste, foam, gel or reactive liquid that cures to a solid. Sullivan et al., U.S. Pat. No. 7,946,932 describes a similar golf ball having an outer core of with a layer of relatively soft HNP and a layer of relatively hard HNP.

Sullivan et al., US Patent Application Publication No. 2012/0122610 describes an inner core layer consisting essentially of a thermoplastic material and having a geometric center hardness greater than a surface hardness to define a negative hardness gradient. the thermoplastic material includes an ionomer, a highly-neutralized ionomer, a thermoplastic polyurethane, a thermoplastic polyurea, a styrene block copolymer, a polyester amide, polyester ether, a polyethylene acrylic acid copolymer or terpolymer, or a polyethylene methacrylic acid copolymer or terpolymer. The hardness gradient may be created by exposing the inner core layers to 1) a high-energy radiation treatment, such as electron beam or gamma radiation, 2) lower energy radiation, such as UV or IR radiation, 3) a solution treatment, such as an isocyanate or a silane; 4) incorporation of additional free radical initiator groups in the TP prior to molding; and/or 5) chemical modification, such as esterification or saponification.

While various uses for highly neutralized acid polymers in golf balls have been discovered, there is a need to improve golf ball materials using highly neutralized acid polymers or other thermoplastic polymers to particular golf ball constructions having desirable properties.

SUMMARY OF THE DISCLOSURE

This section provides a general summary of the disclosure and is not comprehensive of its full scope or all of the disclosed features.

A hollow golf ball center defined by an intermediate layer including a thermoplastic ionomer resin neutralized at least about 40% with a metal cation is filled with an alcohol having up to three carbon atoms or an aqueous alcohol solution to create a hardness gradient in the intermediate layer. The alcohol or aqueous alcohol solution may be left in the center, removed from the center leaving the center hollow, or replaced by another material. In various embodiments, the thermoplastic ionomer resin may be neutralized at least about 80% or at least about 90%. Different ionomer resins may be used in combination with each other in the intermediate layer, and the intermediate layer may include non-ionomeric polymers as well as customary fillers and additives.

A golf ball prepared by the method has at least a hollow center, an intermediate layer having an inner surface that defines the hollow center and an outer surface, and a cover forming the outermost layer of the golf ball. The intermediate layer has a gradient hardness increasing from its inner surface to its outer surface. The golf ball may have further intermediate layers between the intermediate layer and the cover. In various embodiments, the golf ball has not thermoset rubber layers. Also in various embodiments, the golf ball has only one intermediate layer, or the intermediate layer with the inner surface defining the center may be from about 5 mm to about 20 mm thick and may define a center from about 5 mm to about 35 mm in diameter.

JIS-C hardness of the intermediate layer is measured using a JIS-C hardness gauge by cutting the sphere in half, then sanding the cut edge as needed to provide a smooth surface. The cut and sanded half is kept at approximately 23° C. with 0% humidity at least 24 hours prior to conducting the test. The JIS-C hardness gauge needle is held perpendicular to the cut sample half's surface and then pressed firmly against the sample to get a clear reading. Measurements for the inner surface of an intermediate layer are taken 1.5 mm in from the inner edge and measurements for the outer surface of an intermediate layer are taken 1.5 mm in from the outer edge along three radii, the center radius forming a 45° angle with each of the outer two radii at a center of the hollow center. The three measurements taken 1.5 mm in from the inner edge are averaged to provide the value for the inner surface hardness, and the three measurements taken 1.5 mm in from the outer edge are averaged to provide the value for the outer surface hardness.

In preferred embodiments, the hardness gradient from the inner edge to the outer edge is continuous. In particular, hardness measurements taken along the three radii at point between the 1.5 mm in from the inner edge and 1.5 mm in from the outer edge increase in hardness from inner edge to outer edge of the intermediate layer.

The golf ball produced by the disclosed method has a more rubber-like "feel" and response. A rubber-like "feel" is preferred by many golfers, where the ball tends to feel softer when hit due to the compression gradient inherent in a solid rubber core.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

BRIEF DESCRIPTION OF THE DRAWINGS

The FIGURE is a partial cross-sectional view of an embodiment of a multi-layer golf ball that illustrates some aspects of the disclosed technology. The parts of the FIGURE are not necessarily to scale.

DETAILED DESCRIPTION

A detailed description of exemplary, nonlimiting embodiments follows.

As shown in the FIGURE, a multi-layer golf ball 100 has a hollow center 110, shown containing a fluid, an intermediate layer 120 made of ionomer resin that is radially outward from the center 110, and a cover 130 that forms the outermost layer of the golf ball 100. The intermediate layer 120 has an inner surface 115 that defines the hollow center 110 and an outer surface 125. The intermediate layer 120 has a hardness gradient, and arrow 135 shows the direction of increasing hardness.

A hollow golf ball center defined by an intermediate layer including a thermoplastic ionomer resin neutralized at least about 40% with a metal cation is filled with an alcohol having up to three carbon atoms or an aqueous alcohol solution to create a hardness gradient in the intermediate layer. The alcohol or aqueous alcohol solution may be left in the center, removed from the center leaving the center hollow, or replaced by another material.

Ionomer resins are metal cation ionomers of addition copolymers of ethylenically unsaturated acids. Preferred ionomers are copolymers of at least one alpha olefin, at least one $C_{3-8}$ α,β-ethylenically unsaturated carboxylic acid, and optionally other comonomers. The copolymers may contain as a comonomer at least one softening monomer such as an ethylenically unsaturated ester, for example vinyl acetate or an alkyl acrylate or methacrylate such as a $C_1$ to $C_8$ alkyl acrylate or methacrylate ester.

The weight percentage of acid monomer units in the ionomer copolymer may be in a range having a lower limit of about 1 or about 4 or about 6 or about 8 or about 10 or about 12 or about 15 or about 20 weight percent and an upper limit of about 20 (when the lower limit is not 20) or about 25 or about 30 or about 35 or about 40 weight percent based on the total weight of the acid copolymer. The α,β-ethylenically unsaturated acid is preferably selected from acrylic acid, methacrylic acid, ethacrylic acid, maleic acid, crotonic acid, fumaric acid, itaconic acid, and combinations of these. In various embodiments, acrylic acid and methacrylic acid may be particularly preferred.

The acid monomer is preferably copolymerized with an alpha-olefin selected from ethylene and propylene. The weight percentage of alpha-olefin units in the ionomer copolymer may be at least about 15 or about 20 or about 25 or about 30 or about 40 or about 50 or about 60 weight based on the total weight of the acid copolymer.

In certain preferred embodiments, the ionomer includes no other comonomer besides the alpha-olefin and the ethylenically unsaturated carboxylic acid. In other embodiments, a softening comonomer is copolymerized. Nonlimiting examples of suitable softening comonomers are alkyl esters of $C_{3-8}$ α,β-ethylenically unsaturated carboxylic acids, particularly those in which the alkyl group has 1 to 8 carbon atoms, for instance methyl methacrylate, ethyl acrylate, ethyl methacrylate, propyl acrylate, propyl methacrylate, butyl acrylate, butyl methacrylate, isobutyl acrylate, tert-butyl methacrylate, hexyl acrylate, 2-ethylhexyl methacrylate, and combinations of these. When the ionomer includes a softening comonomer, the softening comonomer monomer units may be present in a weight percentage of the copolymer in a range with a lower limit of a finite amount more than zero), or about 1 or about 3 or about 5 or about 11 or about 15 or about 20 weight percent of the copolymer and an upper limit of about 23 or about 25 or about 30 or about 35 or about 50 weight percent of the copolymer.

Nonlimiting specific examples of acid-containing ethylene copolymers include copolymers of ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include copolymers of ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate. In various embodiments the most preferred acid-containing ethylene copolymers include ethylene/(meth)acrylic acid/n-butyl acrylate, ethylene/(meth)acrylic acid/ethyl acrylate, and ethylene/(meth)acrylic acid/methyl acrylate copolymers.

The acid moiety in the ethylene acid copolymer is neutralized by any metal cation. Suitable cations include lithium, sodium, potassium, magnesium, calcium, barium, lead, tin, zinc, aluminum, bismuth, chromium, cobalt, copper, strontium, titanium, tungsten, or a combination of these cations; in various embodiments alkali, alkaline earth, or zinc metal cations are preferred.

In various preferred embodiments, the ionomer resin is formed by adding a sufficiently high molecular weight, monomeric, mono-functional organic acid or salt of organic acid to the acid copolymer or ionomer so that the acid copolymer or ionomer can be neutralized, without losing processability, to a level above the level that would cause the ionomer alone to become non-melt-processable. The monomeric, mono-functional organic acid its salt may be added to the ethylene-unsaturated acid copolymers before they are neutralized or after they are optionally partially neutralized to a level between about 1 and about 100%, provided that the level of neutralization is such that the resulting ionomer remains melt-processable. In generally, when the monomeric, mono-functional organic acid is included the acid groups of the copolymer may be neutralized from at least about 40 to about 100%, preferably at least about 80% to about 100%, more preferably at least about 90% to about 100%, still more preferably at least about 95% to about 100%, and most preferably about 100% without losing processability. Such high neutralization, particularly to levels of at least about 80% or at least about 90% or at least about 95% or most preferably 100%, without loss of processability can be done by (a) melt-blending the ethylene α,β-ethylenically unsaturated carboxylic acid copolymer or a melt-processable salt of the copolymer with the organic acid or the salt of the organic acid, and (b) adding a sufficient amount of a cation source up to 110% of the amount needed to neutralize the total acid in the copolymer or ionomer and organic acid or salt to the desired level to increase the level of neutralization of all the acid moieties in the mixture preferably at least about 80%, at least about 90%, at least about 95%, or preferably to about 100%. To obtain 100% neutralization, it is preferred to add a slight excess of up to 110% of cation source over the amount stoichiometrically required to obtain the 100% neutralization.

The preferred monomeric, monofunctional organic acid are aliphatic or aromatic saturated or unsaturated acids that may have from 6 or about 8 or about 12 or about 18 carbon atoms to about 36 carbon atoms or less than 36 carbon atoms. Nonlimiting suitable examples of the monomeric, monofunctional organic acid includes caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives of these, and their salts, particularly the barium, lithium, sodium, zinc, bismuth, chromium, cobalt, copper, potassium, strontium, titanium, tungsten, magnesium or calcium salts. These may be used in any combination.

Many grades of ionomer resins are commercially available, for example from E.I. du Pont de Nemours and Company, Inc. under the trademark Surlyn® or the designation "HPF," from ExxonMobil Chemical under the trademarks Iotek™ and Escor™, or from Honeywell International Inc. under the trademark AClyn®. The various grades may be used in combination.

The polymeric portion of the intermediate layer may include only, or essentially, one or more ionomer resins. In such cases, the ionomer resin or resins may be at least about 90 weight percent, or at least about 95 weight percent, or preferably at least about 97 weight percent or at least about 98 weight percent or at least about 99 weight percent, or more preferably about 100 weight percent of the polymeric portion of the thermoplastic material. In various embodiments, the polymeric portion of the intermediate layer may include one or more thermoplastic polymers, including thermoplastic elastomers, in addition to one or more ionomer resins. Non-limiting examples of other suitable thermoplastic elastomers that can be used in making the intermediate layer include thermoplastic polyolefin elastomers such as metallocene-catalyzed block copolymers of ethylene and α-olefins having 4 to about 8 carbon atoms, thermoplastic polyamide elastomers (PEBA or polyether block polyamides), thermoplastic polyester elastomers, thermoplastic styrene block copolymer elastomers such as poly(styrene-butadiene-styrene), poly(styrene-ethylene-co-butylene-styrene), and poly(styrene-isoprene-styrene), thermoplastic polyurethane elastomers, thermoplastic polyurea elastomers, and dynamic vulcanizates of rubbers in these thermoplastic elastomers and in other thermoplastic matrix polymers.

Thermoplastic polyolefin elastomers are metallocene-catalyzed block copolymers of ethylene and α-olefins having 4 to about 8 carbon atoms that are prepared by single-site metallocene catalysis, for example in a high pressure process in the presence of a catalyst system comprising a cyclopentadienyl-transition metal compound and an alumoxane. Non-limiting examples of the α-olefin softening comonomer include hexane-1 or octene-1; octene-1 is a preferred comonomer to use. These materials are commercially available, for example, from ExxonMobil under the tradename Exact™ and from the Dow Chemical Company under the tradename Engage™.

Suitable thermoplastic styrene block copolymer elastomers that may be used in the thermoplastic materials of the golf ball include poly(styrene-butadiene-styrene), poly(styrene-ethylene-co-butylene-styrene), poly(styrene-isoprene-styrene), and poly(styrene-ethylene-co-propylene) copolymers. These styrenic block copolymers may be prepared by living anionic polymerization with sequential addition of styrene and the diene forming the soft block, for example using butyl lithium as initiator. Thermoplastic styrene block copolymer elastomers are commercially available, for example, under the trademark Kraton™ sold by Kraton Polymers U.S. LLC, Houston, Tex. Other such elastomers may be made as block copolymers by using other polymerizable, hard, non-rubber monomers in place of the styrene, including meth(acrylate) esters such as methyl methacrylate and cyclohexyl methacrylate, and other vinyl arylenes, such as alkyl styrenes.

Thermoplastic polyurethane elastomers such as thermoplastic polyester-polyurethanes, polyether-polyurethanes, and polycarbonate-polyurethanes may be used in the thermoplastic materials, particularly in the third thermoplastic material for the cover. The thermoplastic polyurethane elastomers include polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

The polyester diols used in forming a thermoplastic polyurethane elastomer are in general prepared by the condensation polymerization of one or more polyacid compounds and one or more polyol compounds. A polymeric polyether or polycaprolactone diol reactant for preparing thermoplastic polyurethane elastomers may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. In one preferred embodiment, the lactone is ε-caprolactone. In other embodiments, a diol initiator may be reacted with an oxirane-containing compound to produce a polyether diol to be used in the polyurethane elastomer polymerization. The oxirane-containing compound is preferably selected from ethylene oxide, propylene oxide, butylene oxide, tetrahydrofuran, and combinations of these. Polytetrahydrofuran, also known as polytetramethylene ether glycol (PTMEG), is one preferred polymeric polyol for use in making the thermoplastic polyurethane elastomer. Aliphatic polycarbonate diols that may be used in making a thermoplastic polyurethane elastomer may be prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Aromatic polycarbonates are usually prepared from reaction of bisphenols, e.g., bisphenol A, with phosgene or diphenyl carbonate.

Suitable thermoplastic polyurea elastomers may be prepared by reaction of one or more polymeric diamines or polyols with one or more of the polyisocyanates and one or more diamine extenders. Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of a cyclic lactam, such as $\epsilon$-caprolactam or $\omega$-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Specific examples of suitable polyamide block copolymers include NYLON 6, NYLON 66, NYLON 610, NYLON 11, NYLON 12, copolymerized NYLON MXD6, and NYLON 46 block copolymer elastomers.

Thermoplastic polyester elastomers have blocks of monomer units with low chain length that form the crystalline regions and blocks of softening segments with monomer units having relatively higher chain lengths. Thermoplastic polyester elastomers are commercially available under the trademark Hytrel® from DuPont and under the trademark Pebax® from Arkema.

The intermediate layer may include one or more fillers. Nonlimiting examples of suitable fillers include clay, talc, asbestos, graphite, glass, mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, aluminum, bismuth, nickel, molybdenum, iron, copper, brass, boron, bronze, cobalt, beryllium and alloys of these), metal oxides (such as zinc oxide, iron oxide, aluminum oxide, titanium oxide, magnesium oxide, zirconium oxide and the like), particulate synthetic plastics (such as high molecular weight polyethylene, polystyrene, polyethylene ionomeric resins and the like), particulate carbonaceous materials (such as carbon black, natural bitumen and the like), as well as cotton flock, cellulose flock and/or leather fiber. The amount and type of filler may be selected to achieve a particular specific gravity, flexural modulus, outer surface hardness, or other properties for the intermediate layer. Nonlimiting examples of heavy-weight fillers that may be used to increase specific gravity include titanium, tungsten, aluminum, bismuth, nickel, molybdenum, iron, steel, lead, copper, brass, boron, boron carbide whiskers, bronze, cobalt, beryllium, zinc, tin, and metal oxides (such as zinc oxide, iron oxide, aluminum oxide, titanium oxide, magnesium oxide, zirconium oxide). Nonlimiting examples of light-weight fillers that may be used to decrease specific gravity include particulate plastics, glass, ceramics, and hollow spheres, regrinds, or foams of these. The fillers are typically used in a finely divided form.

Customary additives can also be included in the intermediate layer, for example dispersants, antioxidants such as phenols, phosphites, and hydrazides, processing aids, surfactants, stabilizers, and so on.

The compounded mixture for forming the intermediate layer may be made by conventional methods, such as melt mixing in a single- or twin-screw extruder, a Banbury mixer, an internal mixer, a two-roll mill, or a ribbon mixer. The compounded mixture may formed into the intermediate layer having a hollow center by usual methods, for example by injection molding two halves that are joined together by friction welding, ultrasonic bonding, melt bonding, or with adhesives.

The hollow center has a diameter of at least about 5 mm or at least about 10 mm or at least about 15 mm and up to about 20 mm or up to about 25 mm or up to about 30 mm or up to about 35 mm. In various embodiments, the hollow core may have a diameter of from about 15 mm or about 16 mm to about 18 mm or to about 19 mm or to about 20 mm.

The intermediate layer may have a thickness of at least about 4 mm or at least about 5 mm or at least about 6 mm or at least about 7 mm or at least about 8 mm or at least about 10 mm and up to about 10 mm or up to about 12 mm or up to about 12 mm or up to about 15 mm or up to about 18 mm or up to about 20 mm. In various embodiments, the core layer may have a thickness of from about 8 mm or from about 10 mm up to about 11 mm or up to about 12.7 mm.

Before or after the cover is applied to the ball, or before or after the further processing steps of the ball with the cover, the hollow center is filled with an alcoholic member selected from the group consisting of alcohols having up to three carbon atoms and aqueous alcohol solutions. Examples of alcohols with up to three carbon atoms are methanol, ethanol, propanol, isopropanol, ethylene glycol, propylene glycol, glycerol, glycolic acid, and 2-propen-1-ol, and combinations of these; monoalcohols and combinations of monoalcohols are preferred, and methanol, ethanol, isopropanol, and their combinations are particular preferred. Examples of aqueous alcohol solutions include solutions of ethanol, propanol, isopropanol, ethylene glycol, propylene glycol, glycerol, glycolic acid, and 2-propen-1-ol, water-soluble ethylene glycol monoalkyl ethers and diethylene glycol monoalkyl ethers, particularly the methyl, ethyl, propyl, and butyl ethers, propylene glycol monomethyl ether, dipropylene glycol monomethyl ether, and combinations of these. The aqueous alcohol solutions may include from about 20 weight percent or about 25 weight percent or about 30 weight percent or about 40 weight percent or about 50 weight percent of the alcohol up to about 60 weight percent or up to about 70 weight percent or up to about 80 weight percent or up to about 90 weight percent of the alcohol. Particularly preferred are aqueous solutions of from about 20 or about 30 or about 50 weight percent up to about 70 or about 80 or about 90 weight percent of methanol, ethanol, isopropanol, ethylene glycol, propylene glycol, or combinations of these in water.

For example, the intermediate layer may be made with a port for filling with the alcohol or aqueous alcohol solution, or a hole for filling may be drilled through one side of the intermediate layer into the hollow center. After the hollow center is filled with the alcohol or alcohols or the aqueous alcohol solution, the port or hole may be sealed, for example with a gum, a molten polymer plug that solidifies after introduction into the port or hole or by friction welding or ultrasonically welding a plug into the port or hole.

The alcohol or alcohols or aqueous alcohol solution in the hollow core creates a hardness gradient in the intermediate layer with hardness increasing from the inner surface to the outer surface. Preferably, the hardness gradient in continuously increases through at least about 50% or at least about 60% or at least about 70% or at least about 80% at least about 90% of the width of the intermediate layer. In various embodiments the hardness gradient provides a difference in hardness between the inner surface and the outer surface of at least about 15 JIS-C hardness units or at least about 30 JIS-C hardness units or at least about 58 JIS-C hardness units. In various embodiments, the hardness of the inner surface of the intermediate layer may be about 13 JIS-C or about 20 JIS-C or about 30 JIS-C and the hardness of the outer surface of the intermediate layer may be about 60 JIS-C or about 70 JIS-C or about 80 JIS-C. The conditions for obtaining a desired hardness gradient may determined by straightforward experimentation, for example by measuring the hardness gradient on a test ball or test intermediate layer.

The alcohol or aqueous alcohol solution may be removed from the hollow center after a desired hardness gradient is obtained. In a first embodiment, the hollow center is left hollow in the golf ball, particularly when the golf ball with nothing in the hollow center is at or near the USGA weight for golf balls used in competition of no greater than 1.62 ounces (45.926 g), for example, from about 40 g or about 42 g or about 44 g or about 45 g up to about the 45.926 g limit.

In other embodiments, the alcohol or aqueous alcohol solution may be removed from the hollow center after a desired hardness gradient is obtained, then replaced with another fluid. The fluid may be a gas, liquid, gel, paste, or the like, or some combination of these. Suitable fluids include a wide variety of materials, including solutions and gases, as well as liquids having low coefficient of thermal expansion and/or high boiling points. The fluid is preferably selected from gases (and may be pressurized or non-reactive), such as air, nitrogen, helium, argon, neon, carbon dioxide, nitrous oxide, and combination of these; water; polyols, such as glycerine, ethylene glycol, propylene glycol, and oligomers of ethylene glycol or propylene glycol; pastes; foams; oils; water solutions, such as salt in water, corn syrup, salt in water and corn syrup, or glycol and water; and other combinations. The fluid can also include colloidal suspensions, such as clay, barytes, carbon black in water or other liquid, or salt in water/glycol mixtures; gels, such as gelatin gels, hydrogels, water/methyl cellulose gels and gels of copolymer rubber based materials such as styrene-butadiene-styrene rubber and paraffinic and/or naphthenic oil; or melts including waxes and hot melts that will solidify when they reach normal room temperature. The fluid can also be a reactive liquid system that will react to form a solid in the hollow center. Examples of suitable reactive liquids, include, but are not limited to, silicate gels, agar gels, peroxide-cured polyester resins, two part epoxy resin systems, and peroxide cured liquid polybutadiene rubber compositions.

In certain embodiments, the golf ball has a second intermediate layer between the intermediate layer and the cover. may include an ionomer resin or any of the thermoplastic resins already mentioned, a thermoset rubber composition, or any other composition useful for forming golf ball layers. The second intermediate layer may be formed either before or after the steps of filling the hollow center and creating a hardness gradient and any subsequent emptying, refilling, or reaction step as described.

A cover layer is molded over the ball. In various embodiments, any thermoplastic or thermoset material may be used to make the cover such as thermoplastic and thermoset polyurethane elastomers, thermoplastic and thermoset polyurea elastomers, and ionomer resins, any of the thermoplastic elastomers mentioned above, or a vulcanized rubber such as balata. Light stable polyureas and polyurethanes and ionomer resins are preferred for forming the cover.

The cover may be formulated with a pigment, such as a yellow or white pigment, and in particular a white pigment such as titanium dioxide or zinc oxide. Generally titanium dioxide is used as a white pigment, for example in amounts of from about 0.5 parts by weight or 1 part by weight to about 8 parts by weight or 10 parts by weight passed on 100 parts by weight of polymer. The cover may also contain fillers additives such as any of those mentioned above as well as hindered amine light stabilizers such as piperidines and oxanalides, ultraviolet light absorbers such as benzotriazoles, triazines, and hindered phenols, fluorescent materials and fluorescent brighteners, dyes such as blue dye, and antistatic agents. In various embodiments, a white-colored cover may be tinted with a small amount of blue pigment or brightener.

The cover may be formed on the ball by injection molding, compression molding, casting, vacuum forming, powder coating, and so on. For example, when the cover is formed by injection molding, the rest of the ball fabricated beforehand may be set inside a mold, and the cover material may be injected into the mold. The cover is typically molded on the core by injection molding or compression molding. Alternatively, another method that may be used involves pre-molding a pair of half-covers from the cover material by die casting or another molding method, enclosing the rest of the ball in the half-covers, and compression molding at, for example, between 120° C. and 170° C. for a period of 1 to 5 minutes to attach the cover halves around the rest of the ball, which may be surface-treated before the cover is formed over it to increase the adhesion of the cover. Nonlimiting examples of suitable surface preparations include mechanically or chemically abrasion, corona discharge, plasma treatment, or application of an adhesion promoter such as a silane or of an adhesive. The cover typically has a dimple pattern and profile to provide desirable aerodynamic characteristics to the golf ball.

Typically, the cover may have a thickness of from about 0.5 mm to about 3 mm.

The golf balls can be of any size, although the USGA requires that golf balls used in competition have a diameter of at least 1.68 inches (42.672 mm) and a weight of no greater than 1.62 ounces (45.926 g). For play outside of USGA competition, the golf balls can have smaller diameters and be heavier.

After a golf ball has been molded, it may undergo various further conventional processing steps such as buffing, painting and marking. In a particularly preferred embodiment of the invention, the golf ball has a dimple pattern that coverage of 65% or more of the surface. The golf ball typically is coated with a durable, abrasion-resistant and relatively non-yellowing finish coat.

The following examples illustrate, but do not in any way limit, the scope of the methods and compositions as described and claimed. All parts are parts by weight unless otherwise noted.

EXAMPLES

Three identical intermediate layers having hollow centers were prepared by injection molding hemispherical intermediate halves from DuPont™ HPF 2000 (a highly neutralized ionomer resin obtained from E.I. du Pont de Nemours and Co. Inc.) then joining the two halves by friction welding. Each intermediate layer had an outer diameter of 1.56 inches (39.6 mm) and an inner diameter of 0.675 inches (17.02 mm), which was ground to an outer diameter of 39.4 mm. A 1.77 mm cover was applied to each intermediate layer to make a ball with a diameter of 1.69 inches (42.93 mm).

The hollow center of the ball of the Comparative Example was filled with water. The hollow center of the ball of the Example 1 of the invention was filled with a solution of 70 wt % isopropanol in 30 wt % water. The hollow center of the ball of the Example 2 of the invention was filled with isopropanol alone. The three test balls were then sealed where the liquids had been injected into the hollow centers.

All three test balls were kept at 21° C. for 30 days. Then, each ball was cut in half and emptied. The cut edge was sanded smooth, then the cut and sanded half was kept at approximately 23° C. with 0% humidity at least 24 hours prior to testing hardness. JIS-C hardness of each test ball's intermediate layer was measured using a JIS-C hardness gauge by holding the JIS-C hardness gauge needle perpendicular to the cut sample half's surface and then pressing firmly against the sample to get a clear reading. Measurements were taken 1.5 mm in from the inner edge and at continuing 1.5 mm intervals toward outer surface of an intermediate layer along three radii, the center radius forming a 45° angle with each of the outer two radii at a center of the hollow center. The three measurements taken at each 1.5 mm interval are recorded in the table below and averaged to provide an average hardness.

| Distance from inner surface in mm | Comparative Example (water) | | | | Example 1 (70 wt % isopropanol in H$_2$O) | | | | Example 2 (isopropanol) | | | |
|---|---|---|---|---|---|---|---|---|---|---|---|---|
| | '−45° | 0° | '+45° | Average | '−45° | 0° | '+45° | Average | '−45° | 0° | '+45° | Average |
| | JIS-C hardness | | | | JIS-C hardness | | | | JIS-C hardness | | | |
| 1.5 | 69.8 | 70.9 | 69.4 | 70 | 13.9 | 13.7 | 12.9 | 13.5 | 57.7 | 54.2 | 59.8 | 57.2 |
| 3.0 | 73.4 | 72.9 | 74.4 | 73.6 | 21.1 | 18.5 | 18.9 | 19.5 | 65 | 63.6 | 66.1 | 64.9 |
| 4.5 | 75.2 | 76.5 | 75.3 | 75.7 | 29.9 | 29.4 | 31.3 | 30.2 | 68.1 | 69.2 | 69.5 | 68.9 |
| 6.0 | 75.6 | 76.9 | 76.7 | 76.4 | 62.3 | 65.8 | 64.5 | 64.2 | 73.2 | 72.2 | 73.1 | 72.8 |
| 7.5 | 77.3 | 74.3 | 76.6 | 76.1 | 72.6 | 71.5 | 70.6 | 71.6 | 74.4 | 75.2 | 72.2 | 73.9 |
| 9.0 | 77.5 | 75.7 | 77 | 76.7 | 71.4 | 71.3 | 71.7 | 71.5 | 75.6 | 75.4 | 72.6 | 74.5 |

The results demonstrate that no appreciable hardness gradient was obtained with the water alone, while isopropanol produced a hardness gradient of 17.3 JIS-C hardness units and the 70 wt % aqueous isopropanol produced a hardness gradient of 58 JIS-C hardness units.

The description is merely exemplary in nature and, thus, variations that do not depart from the gist of the disclosure are a part of the invention. Variations are not to be regarded as a departure from the spirit and scope of the disclosure

What is claimed is:

1. A method of making a golf ball, comprising:
   (a) providing a golf ball having a hollow center, an intermediate layer comprising a thermoplastic ionomer resin neutralized at least about 40% with a metal cation, wherein the intermediate layer has an inner surface adjacent to and defining the hollow center and an outer surface, and a cover forming the surface of the golf ball;
   (b) filling the hollow center with an alcoholic member selected from the group consisting of alcohols having up to three carbon atoms and aqueous alcohol solutions;
   wherein the alcoholic member creates a hardness gradient in the intermediate layer with hardness increasing from the inner surface to the outer surface.

2. A method according to claim 1, wherein the ionomer resin comprises a combination of
   (i) a copolymer of an alpha olefin, from about 4 wt. % to about 35 wt. % of an ethylenically unsaturated acid, and, optionally, a softening monomer;
   (ii) an aliphatic, monomeric, mono-functional organic acid, and
   (iii) a sufficient amount of a metal cation to neutralize at least about 80% of the combined acid groups of (i) and (ii).

3. A method according to claim 2, wherein the alpha olefin is ethylene.

4. A method according to claim 2, wherein the component (ii) has from about 6 to less than 36 carbon atoms.

5. A method according to claim 2, wherein metal cation (iii) neutralizes at least about 95% of the combined acid groups of (i) and (ii).

6. A method according to claim 1, wherein the alcoholic member comprises methanol, ethanol, or isopropanol.

7. A method according to claim 1, wherein the alcoholic member comprises an aqueous isopropanol solution.

8. A method according to claim 7, wherein the aqueous isopropanol solution comprises from about 20 weight percent to about 90 weight percent of the isopropanol.

9. A method according to claim 7, wherein the aqueous isopropanol solution comprises from about 30 weight percent to about 80 weight percent of the isopropanol.

10. A method according to claim 7, wherein the aqueous isopropanol solution comprises from about 50 weight percent to about 80 weight percent of the isopropanol.

11. A method according to claim 1, wherein the hollow center has a diameter of from about 15 mm to about 19 mm.

12. A method according to claim 1, wherein the intermediate layer has a thickness of from about 10 mm to about 12.7 mm.

13. A method according to claim 1, wherein the hardness gradient provides a difference in hardness between the inner surface and the outer surface of at least about 15 JIS-C hardness units.

14. A method according to claim 1, wherein the hardness gradient provides a difference in hardness between the inner surface and the outer surface of at least about 30 JIS-C hardness units.

15. A method according to claim 1, further comprising removing the alcoholic member from the hollow center after creating the hardness gradient.

16. A method according to claim 15, wherein the golf ball has a weight of from about 40 g to about 45.926 g after the alcoholic member is removed.

17. A method according to claim 15, wherein the hollow center is filled with another fluid after the alcoholic member is removed.

18. A method according to claim 17, wherein the fluid is a liquid.

19. A method according to claim 18, wherein the liquid is gelled inside the hollow center.

20. A method according to claim 17, wherein the fluid is a polymer melt that is solidified in the center.

21. A method according to claim 17, wherein the fluid is a reactive liquid that is reacted to form a solid in the center.

22. A method according to claim 21, wherein the reactive liquid comprises a polymer and a crosslinker for the polymer.

* * * * *